(12) United States Patent
Cai

(10) Patent No.: US 12,326,219 B2
(45) Date of Patent: Jun. 10, 2025

(54) MOBILE DEVICE SUPPORT

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 20 days.

(21) Appl. No.: 18/462,420

(22) Filed: Sep. 7, 2023

(65) Prior Publication Data

US 2024/0301993 A1  Sep. 12, 2024

(30) Foreign Application Priority Data

Mar. 8, 2023  (CN) .......................... 202320418436.7

(51) Int. Cl.
*F16M 13/02* (2006.01)
*H04M 1/04* (2006.01)

(52) U.S. Cl.
CPC ............ *F16M 13/022* (2013.01); *H04M 1/04* (2013.01)

(58) Field of Classification Search
CPC .... F16M 13/022; F16M 11/041; F16M 13/00; H04M 1/04; Y02A 30/00
See application file for complete search history.

(56) References Cited

U.S. PATENT DOCUMENTS

| | | | | |
|---|---|---|---|---|
| 1,554,118 A * | 9/1925 | Moran | ................... | A61J 9/0692 24/339 |
| 5,775,654 A * | 7/1998 | Price | ................... | A47G 23/0225 248/103 |
| 8,678,332 B2 * | 3/2014 | Benthien | ................. | B64C 1/406 248/205.3 |
| 9,803,799 B1 * | 10/2017 | Yang | ................... | F16M 11/2064 |

FOREIGN PATENT DOCUMENTS

CN        110581580 A  * 12/2019

* cited by examiner

*Primary Examiner* — Kimberly T Wood

(57) ABSTRACT

A mobile device support relates to a technical field of mobile device peripherals and includes a supporting portion and a clamping assembly. The supporting portion is configured to support a mobile device. A first part of the clamping assembly is configured to support the supporting portion. A second part of the clamping assembly is assembled on a mounting object. a connecting plate is disposed on the clamping assembly. The connecting plate is a flat, arc-shaped, or semi-circular connecting plate. After the mounting object is inserted into a clamping space, a supporting column is located above the mounting object, so that a gravity center of the clamping assembly is located on the mounting object, thus improving stability of the mobile device support. The present disclosure solves problems of poor stability and easy tilting or falling of a clamping assembly of an existing mobile device support.

8 Claims, 4 Drawing Sheets

MOBILE DEVICE SUPPORT

TECHNICAL FIELD

The present disclosure relates to a technical field of mobile device peripherals, and in particular to a mobile device support with high stability.

BACKGROUND

With popularization of mobile phones, more and more people use the mobile phones to communicate with people, view videos, and the like. In order to facilitate people to use the mobile phones conveniently, mobile phone supports are created. However, a supporting column of a clamping assembly disposed at a bottom of a conventional mobile phone support is generally located on an outer edge of a mounting object after the mobile phone support are assembled with the mounting object, so that a gravity center of a base of the conventional mobile phone support is located on the outer edge of the mounting object. As a result, stability of the clamping assembly of the conventional mobile phone support is generally unsatisfactory and the mobile phone support is easy to incline or fall.

SUMMARY

In order to solve defects in the prior art, the present disclosure provides a mobile device support with high stability. The mobile device support with high stability has an advantage that after the mobile device support is mounted with a mounting object, a gravity center of a base of the mobile device support is located on the mounting object, which improves stability of the base of the mobile device support.

In order to achieve above purpose, technical scheme adopted by the present disclosure is as follows: a mobile device support with high stability includes: a supporting portion 70 and a clamping assembly. The supporting portion 70 is configured to support a mobile device. A first part of the clamping assembly is configured to support the supporting portion 70. A second part of the clamping assembly is assembled on the mounting object. The clamping assembly includes a supporting column and a sleeve. The supporting column is disposed on the clamping assembly. The sleeve is movably sleeved on the supporting column. A first end of the supporting column is connected to the supporting portion. A connecting plate is disposed at a second end of the supporting column. A first clamping plate is disposed on one side, distal from the supporting column, of the connecting plate. A second clamping plate is disposed between the sleeve and the first clamping plate. The sleeve is configured to push the second clamping plate. The second clamping plate, the first clamping plate, and the connecting plate form a clamping space. The mounting object is clamped in the clamping space. An axial extension line of the supporting column penetrates through the clamping space. When a position of the sleeve on the supporting column is adjusted, a size of the clamping space is adjusted accordingly.

Optionally, internal threads are defined in the sleeve. External threads matched with the internal thread are defined on a side surface of the supporting column.

Optionally, the sleeve and the second clamping plate are rotatably connected. A guide portion is disposed between the connecting plate and the second clamping plate. When the sleeve slides and spirally rotates, the guide portion is configured to prevent the second clamping plate from rotating, so the second clamping plate moves along an axial direction of the connecting plate.

Optionally, a first part of the guide portion is a guide groove formed in one side, distal from the clamping space, of the connecting plate. A second part of the guide portion is a guide block disposed on the second clamping plate and matched with the guide groove.

Optionally, an annular protrusion is disposed on an inner side surface, close to the second clamping plate, of the sleeve. A frame body extending into the sleeve is disposed on the second clamping plate. An annular clamping ring matched with the annular protrusion is disposed on the frame body.

Optionally, the supporting column is an asterisk-shaped pipe.

Optionally, a connecting component is disposed between the asterisk-shaped pipe and the supporting portion. A first part of the connecting component is shaken by the supporting portion. A second part of the connecting component is detachably assembled with the asterisk-shaped pipe.

Optionally, the connecting component is a mounting base. A screw hole is defined on a central position of the mounting base. A threaded hole matched with the screw hole is defined on a central position of the asterisk-shaped pipe. A damping shaft assembled with the supporting portion is disposed on the mounting base.

Optionally, the connecting plate is a flat connecting plate, an arc-shaped connecting plate, or a semi-circular connecting plate.

Optionally, a surface, distal from the clamping space, of the connecting plate is an arc-shaped surface. A radian of the arc-shaped surface is matched with a radian of a cross section of the sleeve.

In the present disclosure, the connecting plate is provided, and the connecting plate is the flat connecting plate, the arc-shaped connecting plate, or the semi-circular connecting plate. After the mounting object is clamped in the clamping space, the supporting column is located above the mounting object, so that a gravity center of the clamping assembly of the whole mobile device support is located above the mounting object, which improves stability of the mobile device support after assembling with the mounting object.

BRIEF DESCRIPTION OF DRAWINGS

In order to clearly illustrate embodiments of the present disclosure or technical solutions in the prior art, accompanying drawings required to be used in the embodiments or the prior art are briefly described below. Obviously, the drawings in following description are merely some embodiments of the present disclosure. For a person of ordinary skill in the prior art, other drawings can be obtained according to the drawings without involving any inventive effort.

Figure 1:
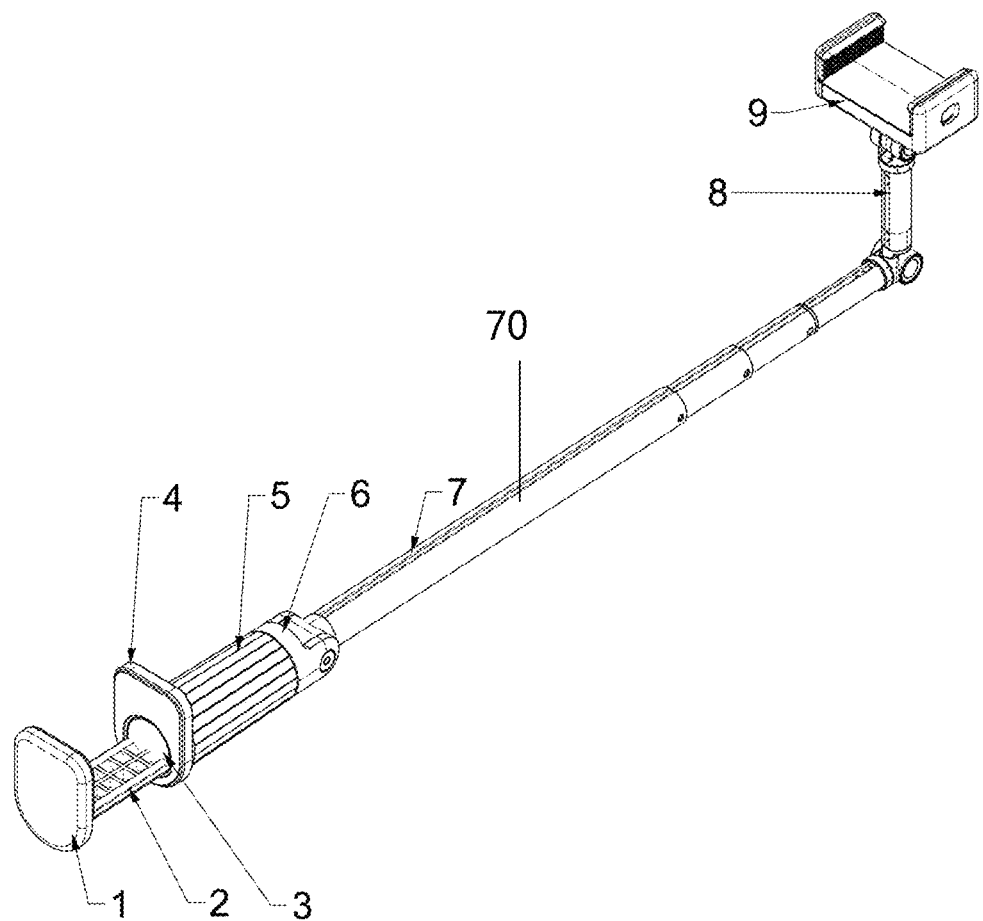
FIG. 1 is a structural schematic diagram of a mobile device support with high stability according to one embodiment of the present disclosure.

Reference numbers in the drawings: 1. first clamping plate; 11. first friction pad; 2. connecting plate; 21. guide groove; 3. supporting column; 31. external thread; 32. threaded hole; 4. second clamping plate; 41. through hole;

42. second friction pad; 43. frame body; 44. annular clamping ring; 45. guide block; 5. sleeve; 51. annular protrusion; 52. nut; 53. gasket; 6. connecting component; 61. screw hole; 62. third damping shaft; 63. bolt; 7. telescopic rods; 8. adjusting rod; 81. first damping shaft; 9. clamping portion; 91. second damping shaft.

DETAILED DESCRIPTION

The present disclosure is described in details below with reference to accompanying drawings.

Specific embodiments are merely explanations of the present disclosure, and are not limitations on the present disclosure. After reading specification, a person skilled in art makes modifications which do not create contributions to the embodiments according to needs, but are protected by patent law only within a scope of claims of the present disclosure.

The present disclosure provides a mobile device support with high stability, as shown in FIG. 1. The mobile device support with high stability includes a clamping assembly and a supporting portion. The clamping assembly is disposed on a lower portion and the supporting portion is disposed at an upper portion. A top of the clamping assembly is configured to support the whole supporting portion. A bottom of the clamping assembly is configured to be clamped on a mounting object, and the mounting object is a table, a chair, or a bracket.

It needs to be supplemented that the supporting portion includes telescopic rods 7, an adjusting rod 8, and a clamping portion 9. There are four telescopic rods 7, which improve a telescopic range of the telescopic rods 7. One end of a first one of the telescopic rods 7 is connected to the clamping assembly, one end of a last one of the telescopic rods 7 is connected to the adjusting rod 8 through a first damping shaft 81. The adjusting rod 8 is rotatable by a certain angle under an action of the first damping shaft 81, which meets orientation requirements on the mobile device support of a user. A clamping portion 9 is disposed at one end, distal from the telescopic rods 7, of the adjusting rod 8. The clamping portion 9 is configured to clamp a mobile phone. A second damping shaft 91 is disposed at a joint of the clamping portion 9 and the adjusting rod 8, so that the user is able to adjust an orientation of the clamping portion 9 according to various angle requirements.

In the embodiment, the clamping portion 9 is made of flexible materials. The clamping portion 9 is disposed in a shape of "[". A plurality of anti-slip protrusions are disposed on two sides of the clamping portion for clamping the mobile phone, which improves friction force between the mobile phone and the clamping portion, and remarkably improves clamping stability of the mobile phone.

In other embodiments, the number of the telescopic rods 7 is freely set, e.g., two telescopic rods 7, three telescopic rods 7, or five telescopic rods 7 may be provided. Further, the telescopic rods 7 may be electric telescopic rods 7. The telescopic rods 7 and the adjusting rod 8 may also be connected through a first one of universal shafts, and the adjusting rod 8 and the clamping portion 9 may also be connected through a second one of the universal shafts.

In another embodiment, the telescopic rods 7, the adjusting rod 8, and the two universal shafts are not provided, and one flexible conduit is provided. Two ends of the flexible conduit are respectively connected to the clamping assembly and the clamping portion 9. Angle and orientation of the mobile phone on the clamping portion 9 is adjusted by freely twisting the flexible conduit, which is simple to operate and has wide adaptability.

Figure 2:
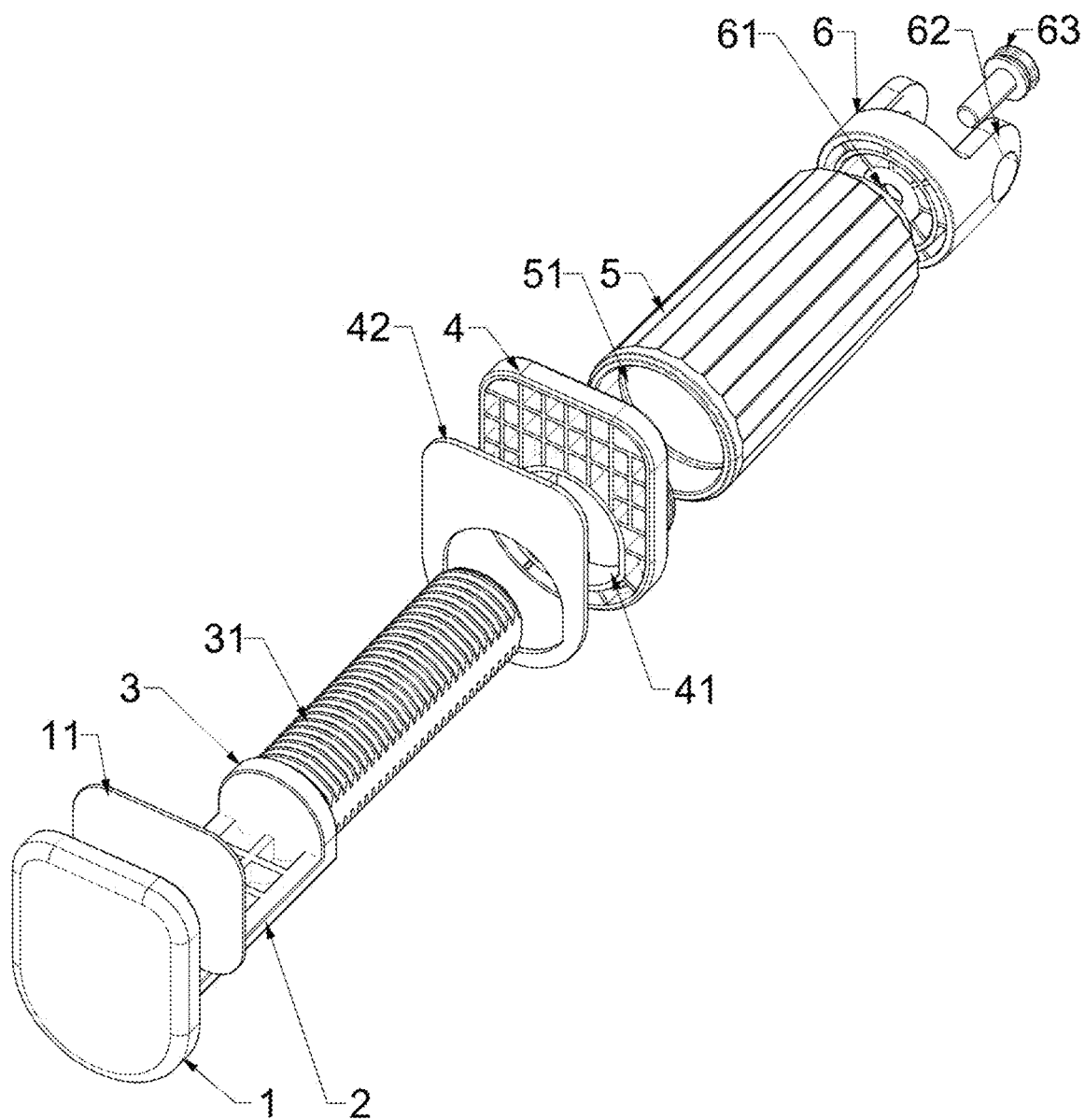
FIG. 2 is an exploded schematic diagram of the mobile device support shown in FIG. 1.

As shown in FIG. 2, the clamping assembly includes a supporting column 3 and a sleeve 5, the sleeve 5 is movably sleeved on the supporting column 3, so that the user is able to move the sleeve 5 along an axis of the supporting column 3. A first end of the supporting column 3 is connected to the supporting portion and is configured to fix the supporting portion 70. a connecting plate 2 is disposed at a second end of the supporting column 3. A first clamping plate 1 is disposed at a bottom of the connecting plate 2 (i.e., one side, distal from the supporting column 3, of the connecting plate 2). A second clamping plate 4 is disposed between the sleeve 5 and the first clamping plate 1. The sleeve 5 is configured to push the second clamping plate 4. The second clamping plate 4 is movable up and down relative to the first clamping plate 1, and a moving range of the second clamping plate 4 is specifically the bottom of the connecting plate 2 to a top of the connecting plate 2.

It needs to be supplemented that the second clamping plate 4, the first clamping plate 1, and the connecting plate 2 form a clamping space. The mounting object is clamped in the clamping space. An axial extension line of the supporting column 3 penetrates through the clamping space. That is, when the mounting object is inserted into the clamping space and contacts the connecting plate 2, a gravity center of the supporting column 3 is located on the mounting object, which improves stability of the whole clamping assembly after being assembled with the mounting object. When a position of the sleeve 5 on the supporting column 3 is adjusted, a size of the clamping space is adjusted accordingly. A through hole 41 is defined on the second clamping plate 4, and the through hole 41 allows the supporting column 3 and the connecting plate 2 to pass through.

Optionally, internal threads 54 are defined in the sleeve 5, and is specifically defined on a top of the sleeve 5 (i.e., one side, close to the supporting portion 70, of the sleeve 5). External threads 31 matched with the internal threads 54 are defined on a side surface of the supporting column 3. By rotating the sleeve 5 along an axial direction, the sleeve 5 slides and spirally rotates in a transmission way. The connecting plate 2, the supporting column 3, and the first clamping plate 1 are integrally formed.

When the sleeve 5 moves upwards, a movement range of the first clamping plate 1 is increased, and when the first clamping plate 1 is away from the second clamping plate 4, a height of the clamping space is increased. Similarly, when the sleeve 5 moves downwards, the movement range of the first clamping plate 1 decreases, and when the first clamping plate 1 is close to the second clamping plate 4, the height of the clamping space is reduced.

In the embodiment, a nut 52 is connected to a top of the sleeve 5. The nut 52 is embedded in the top of the sleeve 5. In other embodiments, the internal threads 54 are defined on an inner wall of the sleeve 5. A first friction pad 11 is disposed on a top of the first clamping plate 1, that is, the first friction pad 11 is disposed on a clamping surface of the first clamping plate 1 facing the second clamping plate 4. A second friction pad 42 is disposed on a bottom of the second clamping plate 4, that is, the second friction pad 42 is disposed on a clamping surface of the second clamping plate 4 facing the first clamping plate 1. The two friction pads effectively increase friction force of the first clamping plate 1 and the second clamping plate 4, to the mounting object, which prevent the clamping assembly from slipping after being clamped with the mounting object, and improve the stability of the mobile device support after the whole mobile device support is clamped with the mounting object.

In another embodiment, a sliding groove is defined in an inner surface of the sleeve 5. A sliding block slidable in the sliding groove is disposed on the supporting column 3. When the sleeve 5 is pushed up and down, the sliding block disposed in the sliding groove slides accordingly. The sliding block and the sliding groove play a role in positioning and limiting.

Figure 3:
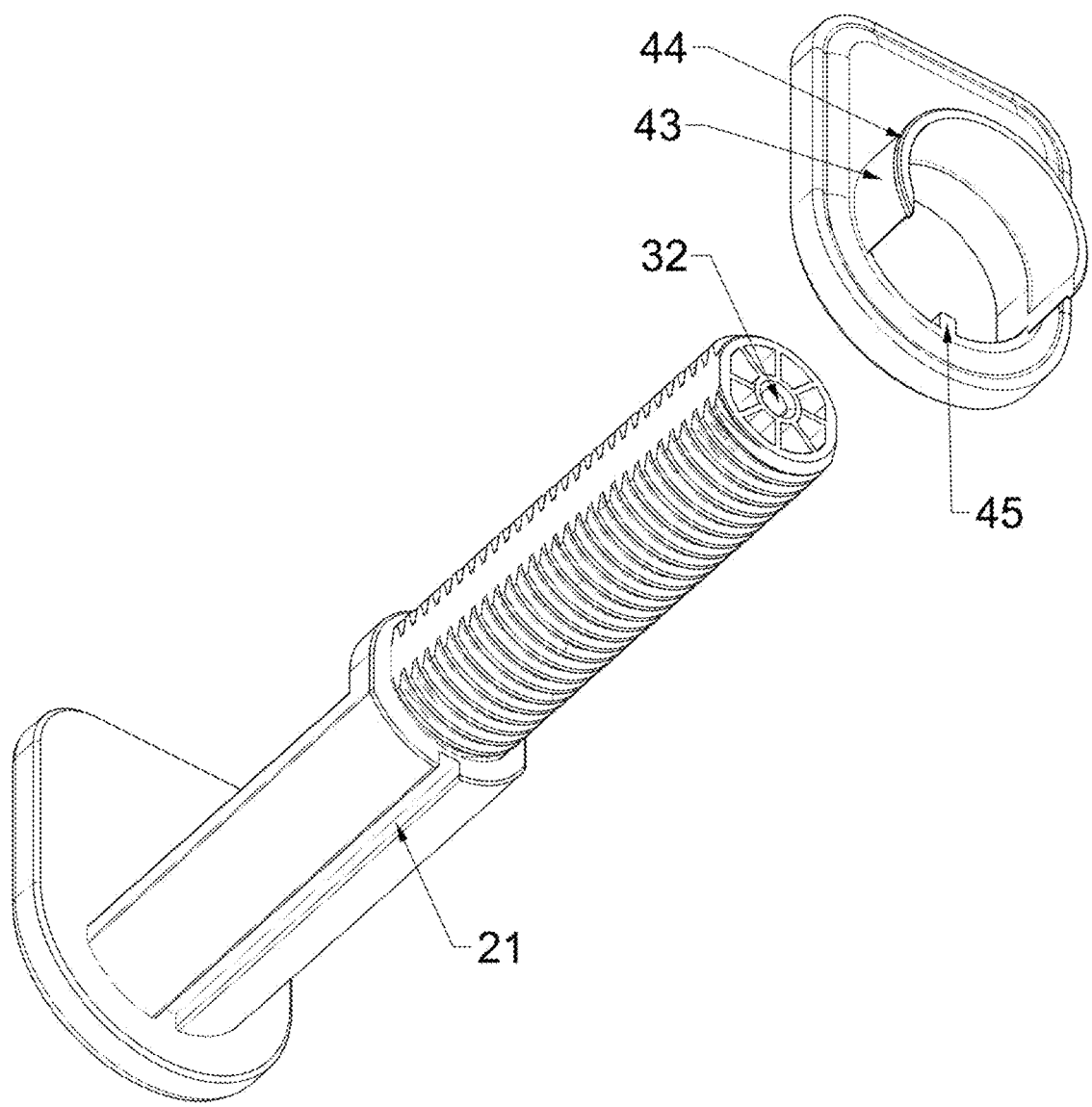
FIG. 3 is a structural schematic diagram of a first part of structures shown in FIG. 2.

As shown in FIG. 3, the connecting plate 2 is specifically a flat connecting plate, an arc-shaped connecting plate, or a semi-circular connecting plate. The connecting plate 2 is vertically disposed at a bottom of the supporting column 3. An included angle between the connecting plate 2 and the first clamping plate 1 is a right angle. One surface, distal from the clamping space, of the connecting plate is an arc-shaped surface, where a radian of the arc-shaped surface is matched with a radian of the cross section of the sleeve 5, which facilitates the connecting plate 2 to pass through the sleeve 5.

It should be noted that anti-slip grooves are defined on an outer wall of the sleeve 5, which improve friction force when the user screws the sleeve 5, so the hand of the user does not slip in a screwing process, ease of screwing is improved, and it is easier for the user to adjust a distance between the first clamping plate 1 and the second clamping plate 4.

Optionally, the sleeve 5 and the second clamping plate 4 are rotatably connected, that is, when the sleeve 5 slides and spirally rotates, the second clamping plate 4 is not driven to spin along with the sleeve 5, but moves upwards or downwards along with the sleeve 5. A guide portion is disposed between the connecting plate 2 and the second clamping plate 4. When the sleeve 5 slides and spirally rotates, the guide portion is configured to prevent the second clamping plate 4 from rotating, so the second clamping plate 4 moves along an axial direction of the connecting plate 2. Therefore the sleeve 5 is prevented from being screwed too fast to drive the second clamping plate 4 to rotate.

It should be noted that an annular protrusion 51 is disposed on an inner side surface of a bottom of the sleeve 5, that is, on an inner side surface, close to the second clamping plate 4, of the sleeve 5. A frame body 43 extending into the sleeve 5 is disposed on the second clamping plate 4. An annular clamping ring 44 matched with the annular protrusion 51 is disposed on the frame body 43. After the frame body 43 is inserted into the bottom of the sleeve 5, the annular clamping ring 44 on the frame body 43 is clamped in an upper portion of the annular protrusion, so that the second clamping plate 4 is prevented from falling off from the bottom of the sleeve 5.

In the embodiment, a first part of the guide portion is a guide groove 21 formed in one side, distal from the clamping space, of the connecting plate 2. A length of the guide groove 21 is matched with a moving range of the sleeve 5. A second part of the guide portion is a guide block 45 disposed on the second clamping plate 4 and matched with the guide groove 21. When the sleeve 5 is screwed to slide and spirally rotates, the second clamping plate 4 moves upwards or downwards. The guide block 45 also moves in the guide groove 21 in the moving process of the second clamping plate 4, which further prevents a situation that the second clamping plate 4 rotates along with the sleeve 5 in the moving process.

In other embodiments, the second clamping plate 4 and the sleeve 5 are independent structures and are not connected. A height of the second clamping plate 4 relative to the first clamping plate 1 is manually adjusted. When in use, the sleeve 5 is rotated to an upper portion, and the mounting object is placed in the clamping space, and at this moment, a lower portion of the mounting object is tightly attached to the first clamping plate 1. Then, the second clamping plate 4 is moved to a position above the mounting object, the sleeve 5 is rotated to move downwards, so the second clamping plate 4 is pushed to abut against an upper portion of the mounting object to complete a clamping process.

Figure 4:
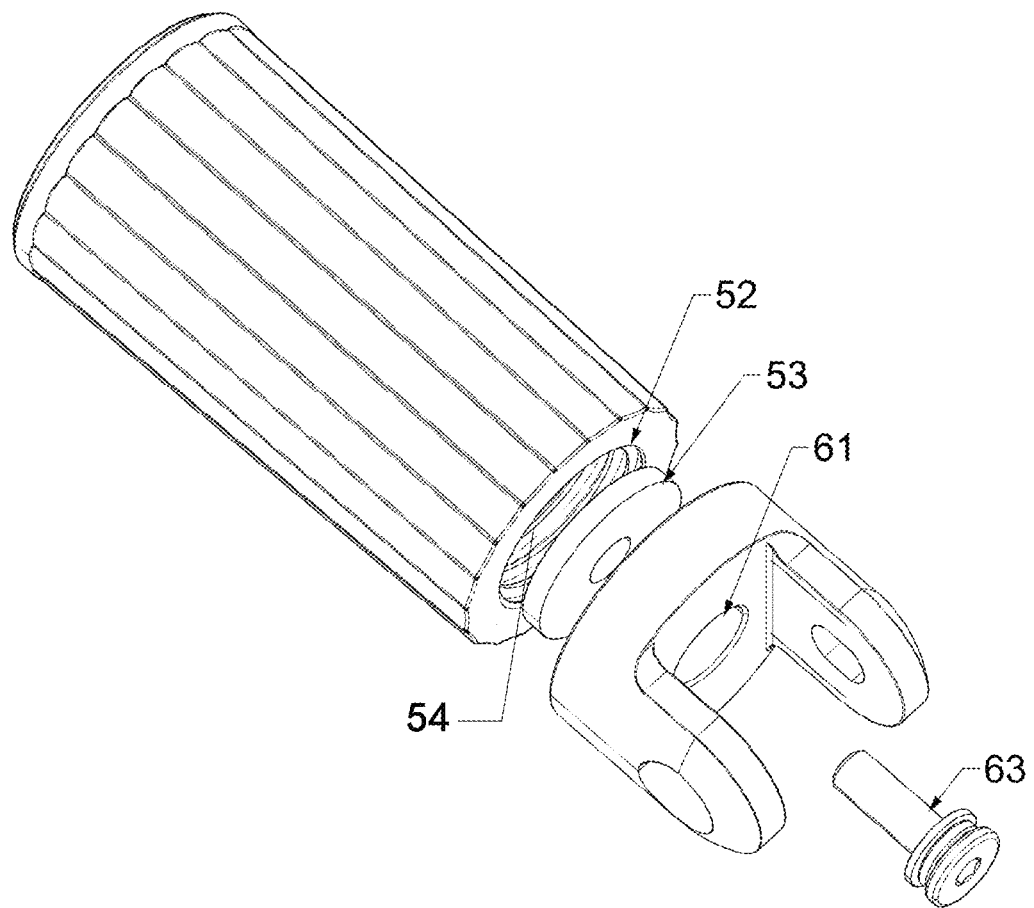
FIG. 4 is a structural schematic diagram of a second part of structures shown in FIG. 2.

As shown in FIG. 4, the supporting column 3 is an asterisk-shaped pipe 3, and a structure of the asterisk-shaped pipe 3 effectively improves strength of the supporting column 3. A connecting component 6 is disposed between the asterisk-shaped pipe 3 and the supporting portion 70. A first part of the connecting component 6 is shaken by the supporting portion 70. A second part of the connecting component 6 is detachably assembled with the asterisk-shaped pipe 3.

In the embodiment, the connecting component 6 is a mounting base 6. A screw hole 61 is defined on a central position of the mounting base 6. A threaded hole 32 matched with the screw hole 61 is defined on a central position of the asterisk-shaped pipe 3. A bolt 63 passes through the screw hole 61 and is screwed with the threaded hole 32, so that a supporting rod and the mounting base 6 are assembled. Optionally, a gasket 53 is further disposed between the supporting rod and the mounting base 6. The bolt 63 also passes through the gasket 53. A distance between the sleeve 5 and the mounting base 6 is increased through the gasket 53, which prevents the mounting base 6 from being worn by rotation of sleeve 5.

It needs to be noted that a third damping shaft 62 assembled with the supporting portion 70 is disposed on the mounting base 6. The part of the supporting portion 70 assembled with the third damping shaft 62 is a bottom of the first one of the telescopic rods 7. As mentioned above, the first damping shaft 81 and the second damping shafts 91 may be replaced with two universal shafts, similarly, the third damping shaft 62 is also able to be replaced by a third one of the universal shafts.

It should be noted that the third damping shaft 62 between the mounting base 6 and the telescopic rods 7, the first damping shaft 81 between the telescopic rods 7 and the adjusting rod 8, and the second damping shafts 91 between the adjusting rod 8 and the clamping portion 9 rotate along a same direction.

Working principle of the present disclosure is substantially as follows: the sleeve 5 is rotated to move upwards. At this time, the second clamping plate 4 is driven to move away from the first clamping plate 1. When the height of the clamping space between the first clamping plate 1 and the second clamping plate 4 is enough to allow the mounting object to enter, the sleeve 5 stops rotating. The clamping space is aligned with the mounting object and the mounting object is inserted into the clamping space until the mounting object contacts the connecting plate 2. At this time, the sleeve 5 is reversely rotated to move downwards, the second clamping plate 4 moves close to the first clamping plate 1, and the height of the clamping space is reduced accordingly until the second clamping plate 4 is tightly attached to the upper portion of the mounting object, and the first clamping plate 1 is tightly attached to the lower portion of the mounting object. Therefore, the clamping assembly is mounted with the mounting object. The mobile phone is placed in the clamping portion 9, the orientation of the mobile phone is adjusted through the three damping shafts. Finally, a length of the telescopic rods 7 to control a height of the mobile phone on the clamping portion 9, so as to obtain the orientation of the mobile phone required by the user.

The above description is only configured to describe the technical solution of the present disclosure, and is not to limit the present disclosure. Any other modifications or equivalent replacements made by a person of ordinary skill in the art to the technical solution of the present disclosure, as long as do not deviate from spirit and scope of the technical solution of the present disclosure, shall be included in the scope of claims of the present disclosure.

What is claimed is:

1. A mobile device support, comprising:
a supporting portion; and
a clamping assembly;
wherein the supporting portion is configured to support a mobile device, a first part of the clamping assembly is configured to support the supporting portion, a second part of the clamping assembly is assembled on a mounting object, the clamping assembly comprises a supporting column and a sleeve, the sleeve is movably sleeved on the supporting column, a first end of the supporting column is connected to the supporting portion, a connecting plate is disposed at a second end of the supporting column, a first clamping plate is disposed on one side, distal from the supporting column, of the connecting plate; and a second clamping plate is disposed between the sleeve and the first clamping plate; the sleeve is configured to push the second clamping plate; and
the second clamping plate, the first clamping plate, and the connecting plate form a clamping space; the mounting object is clamped in the clamping space, an axial extension line of the supporting column penetrates through the clamping space, and when a position of the sleeve on the supporting column is adjusted, a size of the clamping space is adjusted accordingly;
internal threads are defined in the sleeve, and external threads matched with the internal threads are defined on a side surface of the supporting column;
the sleeve and the second clamping plate are rotatably connected, a guide portion is disposed between the connecting plate and the second clamping plate, and when the sleeve slides and spirally rotates, the guide portion is configured to prevent the second clamping plate from rotating, so the second clamping plate moves along an axial direction of the connecting plate.

2. The mobile device support according to claim 1, wherein a first part of the guide portion is a guide groove formed in one side, distal from the clamping space, of the connecting plate; and a second part of the guide portion is a guide block disposed on the second clamping plate and matched with the guide groove.

3. The mobile device support according to claim 1, wherein an annular protrusion is disposed on an inner side surface, close to the second clamping plate, of the sleeve; a frame body extending into the sleeve is disposed on the second clamping plate, and an annular clamping ring matched with the annular protrusion is disposed on the frame body.

4. The mobile device support according to claim 1, wherein the supporting column is an asterisk-shaped pipe.

5. The mobile device support according to claim 4, wherein a connecting component is disposed between the asterisk-shaped pipe and the supporting portion, a first part of the connecting component is attached to the supporting portion, and a second part of the connecting component is detachably assembled with the asterisk-shaped pipe.

6. The mobile device support according to claim 5, wherein a screw hole is defined on a central position of the connecting component, a threaded hole matched with the screw hole is defined on a central position of the asterisk-shaped pipe, and a damping shaft assembled with the supporting portion is disposed on the connecting component.

7. The mobile device support according to claim 6, wherein a surface, distal from the clamping space, of the connecting plate is an arc-shaped surface; and a radian of the arc-shaped surface is matched with a radian of a cross section of the sleeve.

8. A mobile device support, comprising:
a supporting portion; and
a clamping assembly;
wherein the supporting portion is configured to support a mobile device, a first part of the clamping assembly is configured to support the supporting portion, a second part of the clamping assembly is assembled on a mounting object, the clamping assembly comprises a supporting column and a sleeve, the sleeve is movably sleeved on the supporting column, a first end of the supporting column is connected to the supporting portion, a connecting plate is disposed at a second end of the supporting column, a first clamping plate is disposed on one side, distal from the supporting column, of the connecting plate; and a second clamping plate is disposed between the sleeve and the first clamping plate; the sleeve is configured to push the second clamping plate;
the second clamping plate, the first clamping plate, and the connecting plate form a clamping space; the mounting object is clamped in the clamping space, an axial extension line of the supporting column penetrates through the clamping space, and when a position of the sleeve on the supporting column is adjusted, a size of the clamping space is adjusted accordingly;
the supporting column is an asterisk-shaped pipe;
a connecting component is disposed between the asterisk-shaped pipe and the supporting portion, a first part of the connecting component is attached to the supporting portion, and a second part of the connecting component is detachably assembled with the asterisk-shaped pipe;
a screw hole is defined on a central position of the connecting component, a threaded hole matched with the screw hole is defined on a central position of the asterisk-shaped pipe, and a damping shaft assembled with the supporting portion is disposed on the connecting component.

* * * * *